(12) United States Patent
Chen et al.

(10) Patent No.: US 12,474,518 B2
(45) Date of Patent: Nov. 18, 2025

(54) WEDGE-SHAPED LIGHT GUIDE PLATE FOR COLLIMATING BACKLIGHT MODULE, AND COLLIMATING BACKLIGHT MODULE

(71) Applicant: SUZHOU CRYSTALENT CO., LTD., Jiangsu (CN)

(72) Inventors: Yulei Chen, Jiangsu (CN); Peng Wu, Jiangsu (CN); Shujin Zhou, Jiangsu (CN)

(73) Assignee: SUZHOU CRYSTALENT CO., LTD., Jiangsu (CN)

( * ) Notice: Subject to any disclaimer, the term of this patent is extended or adjusted under 35 U.S.C. 154(b) by 219 days.

(21) Appl. No.: 18/285,387

(22) PCT Filed: Apr. 2, 2022

(86) PCT No.: PCT/CN2022/084947
§ 371 (c)(1),
(2) Date: Oct. 3, 2023

(87) PCT Pub. No.: WO2022/233208
PCT Pub. Date: Nov. 10, 2022

(65) Prior Publication Data
US 2024/0184034 A1      Jun. 6, 2024

(30) Foreign Application Priority Data
May 6, 2021   (CN) .......................... 202110488532.4

(51) Int. Cl.
*G02B 6/00*   (2006.01)
*F21V 8/00*   (2006.01)

(52) U.S. Cl.
CPC ......... *G02B 6/0046* (2013.01); *G02B 6/0053* (2013.01); *G02B 6/0055* (2013.01); *G02B 6/0076* (2013.01)

(58) Field of Classification Search
CPC ........................... G02B 6/0046; G02B 6/0053
See application file for complete search history.

(56) References Cited

U.S. PATENT DOCUMENTS

| | | | |
|---|---|---|---|
| 2013/0235613 A1* | 9/2013 | Cheong | G02B 6/0038 362/602 |
| 2021/0088711 A1* | 3/2021 | Johnson | G02B 6/0036 |

FOREIGN PATENT DOCUMENTS

| | | |
|---|---|---|
| CN | 101324726 | 12/2008 |
| CN | 108224132 | 6/2018 |

(Continued)

OTHER PUBLICATIONS

"International Search Report (Form PCT/ISA/210) of PCT/CN2022/084947", mailed on May 30, 2022, with English translation thereof, pp. 1-4.

*Primary Examiner* — Chad H Smith
(74) *Attorney, Agent, or Firm* — JCIPRNET

(57) ABSTRACT

Disclosed are a wedge-shaped light guide plate and a collimating backlight module. The wedge-shaped light guide plate includes an incident surface at a thick end, a first light-emitting surface, a second light-emitting surface and two side surfaces, wherein a wedge angle is formed between the first light-emitting surface and the second light-emitting surface, and an incident micro-prism structure is disposed on the incident surface. The collimating backlight module is composed of at least one wedge-shaped light guide plate, a strip-shaped light source disposed on one side of the incident surface of the wedge-shaped light guide plate, a reverse prism film disposed on one side of the first emergency surface, and a reflecting film disposed on one side of the second emergency surface. Half of the light-emitting angle of the collimating backlight module can reach ±25°, which is superior to the anti-pry angle of most privacy films on the present market.

2 Claims, 7 Drawing Sheets

(56) References Cited

FOREIGN PATENT DOCUMENTS

| | | |
|---|---|---|
| CN | 110032004 | 7/2019 |
| CN | 110208895 | 9/2019 |
| CN | 113238314 | 8/2021 |
| WO | 2019186391 | 10/2019 |

* cited by examiner

WEDGE-SHAPED LIGHT GUIDE PLATE FOR COLLIMATING BACKLIGHT MODULE, AND COLLIMATING BACKLIGHT MODULE

CROSS-REFERENCE TO RELATED APPLICATION

This application is a 371 of international application of PCT application serial no. PCT/CN2022/084947, filed on Apr. 2, 2022, which claims the priority benefit of China application no. 202110488532.4, filed on May 6, 2021. The entirety of each of the above mentioned patent applications is hereby incorporated by reference herein and made a part of this specification.

BACKGROUND

Technical Field

The invention relates to a collimating backlight module for liquid crystal displays, in particular to a wedge-shaped light guide plate for a collimating backlight module, and a collimating backlight module having the wedge-shaped light guide plate.

Description of Related Art

In recent years, the increasingly higher requirements of people for the confidentiality of electronic materials lead to a greater demand for anti-spy screens, so the terminal market demand is great. At present, there are mainly two solutions to realizing the anti-spy performance of display screens: first, a privacy film is disposed on an original display module; and second, a backlight module with an anti-spy property is used to fulfill an anti-spy purpose.

However, in the second application scenario, the collimation of emergent light perpendicular to the light transmission direction of the backlight module needs to be improved.

SUMMARY

The technical issue to be settled by the invention is to provide a wedge-shaped light guide plate for a backlight module, which can effectively improve the collimation of emergent light perpendicular to the light transmission direction of the wedge-shaped light guide plate, and a collimating backlight module having the wedge-shaped light guide plate.

The technical solution adopted by the invention to solve the above technical problems is as follows: a wedge-shaped light guide plate for a collimating backlight module is formed by an incident surface at a thick end, a first light-emitting surface, a second light-emitting surface and two side surfaces, a wedge angle is formed between the first light-emitting surface and the second light-emitting surface, and an incident micro-prism structure is disposed on the incident surface.

The incident micro-prism structure is formed by multiple incident micro-prism strips, which are arranged in parallel and extend from one side surface to the other side surface of the wedge-shaped light guide plate or extend from the first light-emitting surface to the second light-emitting surface.

The cross-section of the incident micro-prism strips is a triangle.

The incident micro-prism structure is formed by multiple incident micro-prism grooves, which are arranged in parallel, and extend from one side surface to the other side surface of the wedge-shaped light guide plate or extend from the first light-emitting surface to the second light-emitting surface.

The incident micro-prism grooves are triangular grooves.

A light-emitting micro-prism structure is disposed on at least one of the first light-emitting surface and the second light-emitting surface.

The light-emitting micro-prism structure is formed by multiple light-emitting micro-prism strips, which are arranged in parallel and extends from the thick end to a thin end of the wedge-shaped light guide plate.

The cross-section of the light-emitting micro-prism strips is a triangle with a vertex angle of 40°-170°, an arc, or a trapezoid.

The light-emitting micro-prism structure is formed by multiple light-emitting micro-prism grooves, which are arranged in parallel, and extend from the thick end to a thin end of the wedge-shaped light guide plate.

The light-emitting micro-prism grooves are triangular grooves with a vertex angle of 40°-170°, arc-shaped grooves, or trapezoidal grooves.

A collimating backlight module having the wedge-shaped light guide plate is composed of at least one wedge-shaped light guide plate, a strip-shaped light source disposed on one side of the incident surface of the wedge-shaped light guide plate, a reverse prism film disposed on one side of the first light-emitting surface, and a reflecting film disposed on one side of the second light-emitting surface, the strip-shaped light source extends from one side surface to the other side surface of the wedge-shaped light guide plate, and a side, provided with micro-prism structures, of the reverse prism film, faces the first light-emitting surface.

The collimating backlight module includes one wedge-shaped light guide plate, a first light-emitting micro-prism structure is disposed on the first light-emitting surface, and a second light-emitting micro-prism structure is disposed on the second light-emitting surface.

The collimating backlight module includes multiple light guide plates which are stacked together with one above the other, a first light-emitting micro-prism structure is disposed on the first light-emitting surface of the wedge-shaped light guide plate adjacent to the reverse prism film, and a second light-emitting micro-prism structure is disposed on the second light-emitting surface of the wedge-shaped light guide plate adjacent to the reflecting film.

The micro-prism structures of the reverse prism film are symmetric or asymmetric triangular structures.

Compared with the prior art, the invention has the following advantages: through the specific incident micro-prism structure disposed on the incident surface of the wedge-shaped guide plate and the reverse prism film of a specific structure, the light-emitting angle can be controlled to meet requirements in different application scenarios; and half of the light-emitting angle of the collimating backlight module using the wedge-shaped light guide plate and the reverse prism film can reach ±25°, which is superior to the anti-pry angle of most privacy films on the present market.

DESCRIPTION OF THE EMBODIMENTS

The invention will be described in further detail below in conjunction with the accompanying drawings.

Figure 1:
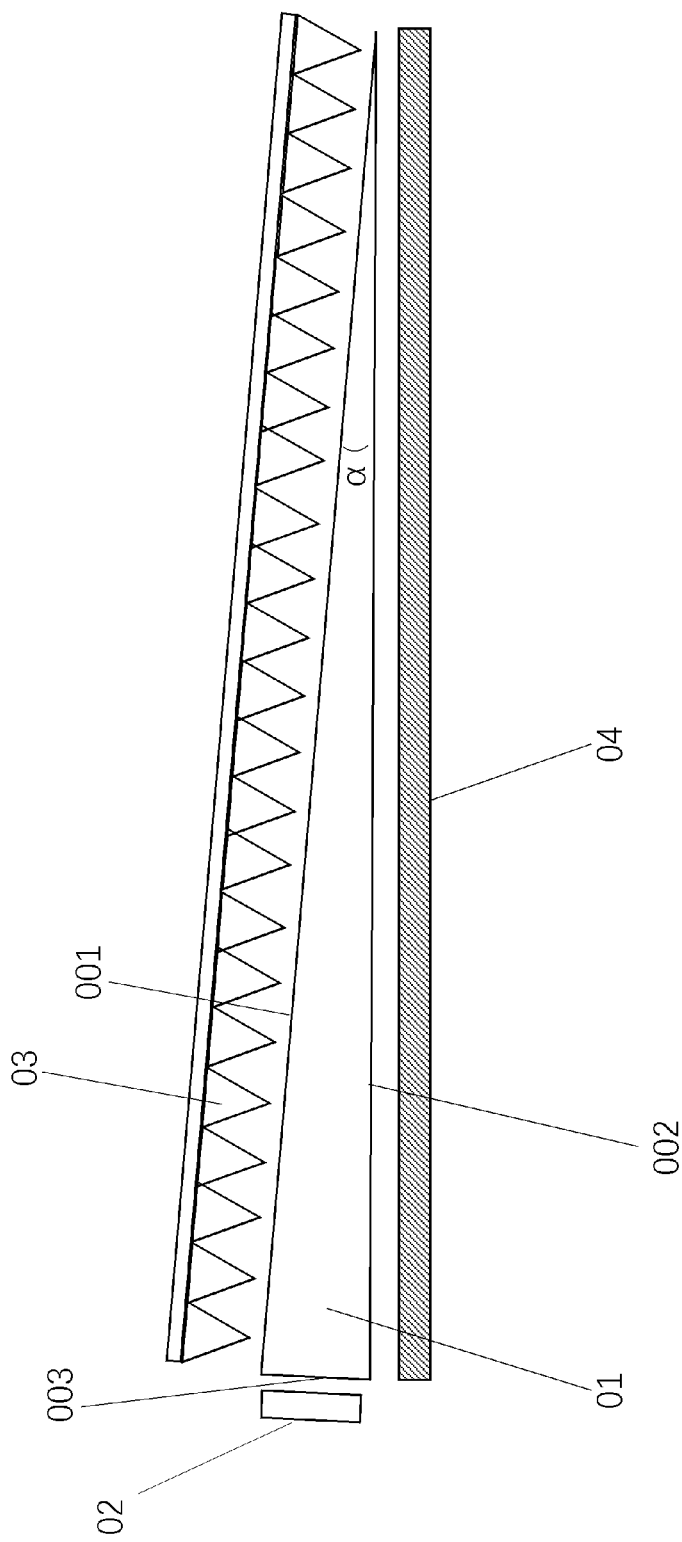
FIG. 1 is a structural view of a collimating backlight module according to a first embodiment of the invention.
Figure 2:
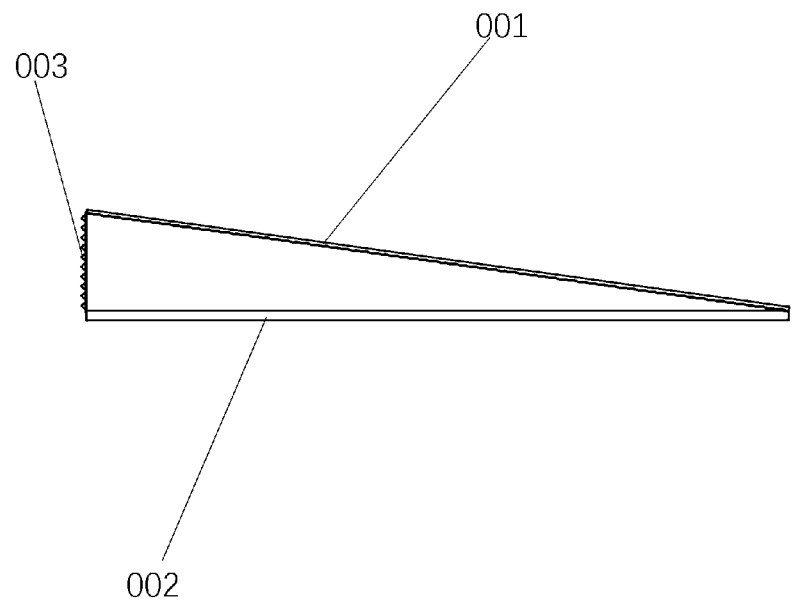
FIG. 2 is a plan structural view of a wedge-shaped light guide plate according to the first embodiment of the invention.
Figure 3:
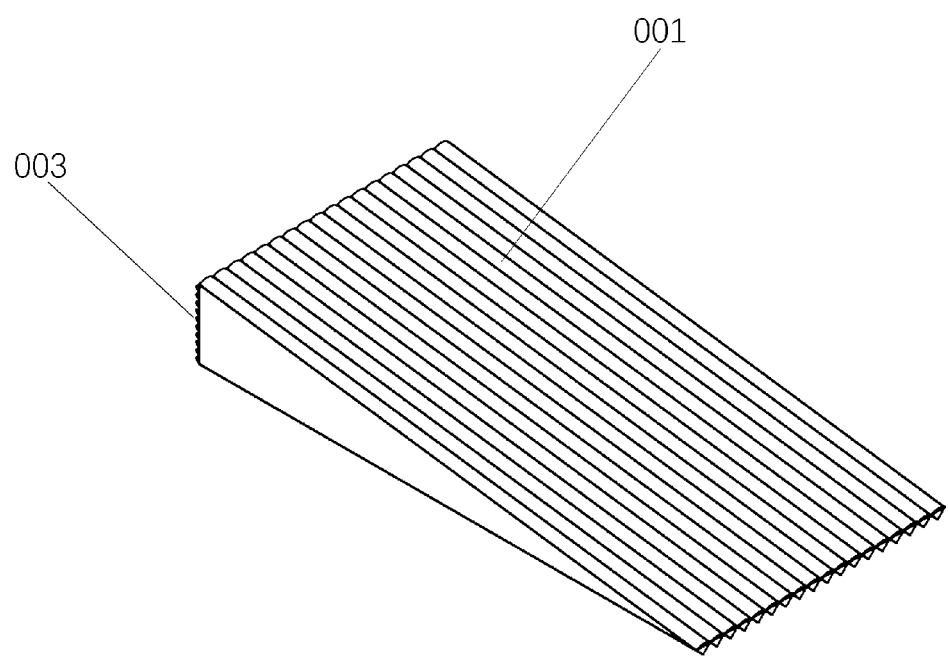
FIG. 3 is a three-dimensional structural view of the wedge-shaped light guide plate according to the first embodiment of the invention.

Embodiment: As shown in FIG. 1, a novel collimating backlight module includes a wedge-shaped light guide plate 01, a strip-shaped light source 02, a reverse prism film 03 and a reflecting film 04, wherein the wedge-shaped light guide plate 01, as shown in FIG. 2 and FIG. 3, is formed by an incident surface 003 at a thick end, a first light-emitting surface 001, a second light-emitting surface 002 and two side surfaces, a wedge angle α is formed between the first light-emitting surface 001 and the second light-emitting surface 002 of the wedge-shaped light guide plate 01, a first light-emitting micro-prism structure is disposed on the first light-emitting surface 001, a second light-emitting micro-prism structure is disposed on the second light-emitting surface 002, an incident micro-prism structure is disposed on the incident surface 003, the first light-emitting micro-prism structure and the second light-emitting micro-prism structure are formed by multiple light-emitting micro-prism strips or light-emitting micro-prism grooves which extend from the thick end to a thin end of the wedge-shaped light guide plate 01 and are arranged in parallel, the incident micro-prism structure is formed by multiple incident micro-prism strips or light-emitting micro-prism grooves which extend from one side surface to the other side surface of the wedge-shaped light guide plate 01 and are arranged in parallel, the strip-shaped light source 02 is disposed on one side of the incident surface 003 of the wedge-shaped light guide plate 01 and extends from one side surface to the other side surface of the wedge-shaped light guide plate 01, the reflecting film 04 is disposed on one side of the second light-emitting surface 002, the reverse prism film 03 is disposed on one side of the first light-emitting surface 001, a side, provided with micro-prism structures, of the reverse prism film 03 faces the first light-emitting surface 001, and in this embodiment, the micro-prism structures of the reverse prism film 03 are symmetric isosceles triangle structures.

In this embodiment, the cross-section of the light-emitting micro-prism strips is a symmetric or asymmetric triangle with a vertex angle of 40°-170°, an arc, or a trapezoid, and the cross-section of the incident micro-prism strips is a triangle.

The light-emitting micro-prism grooves are symmetric or asymmetric triangular grooves with a vertex angle of 40°-170°, arc-shaped grooves, or trapezoidal grooves.

Figure 4:
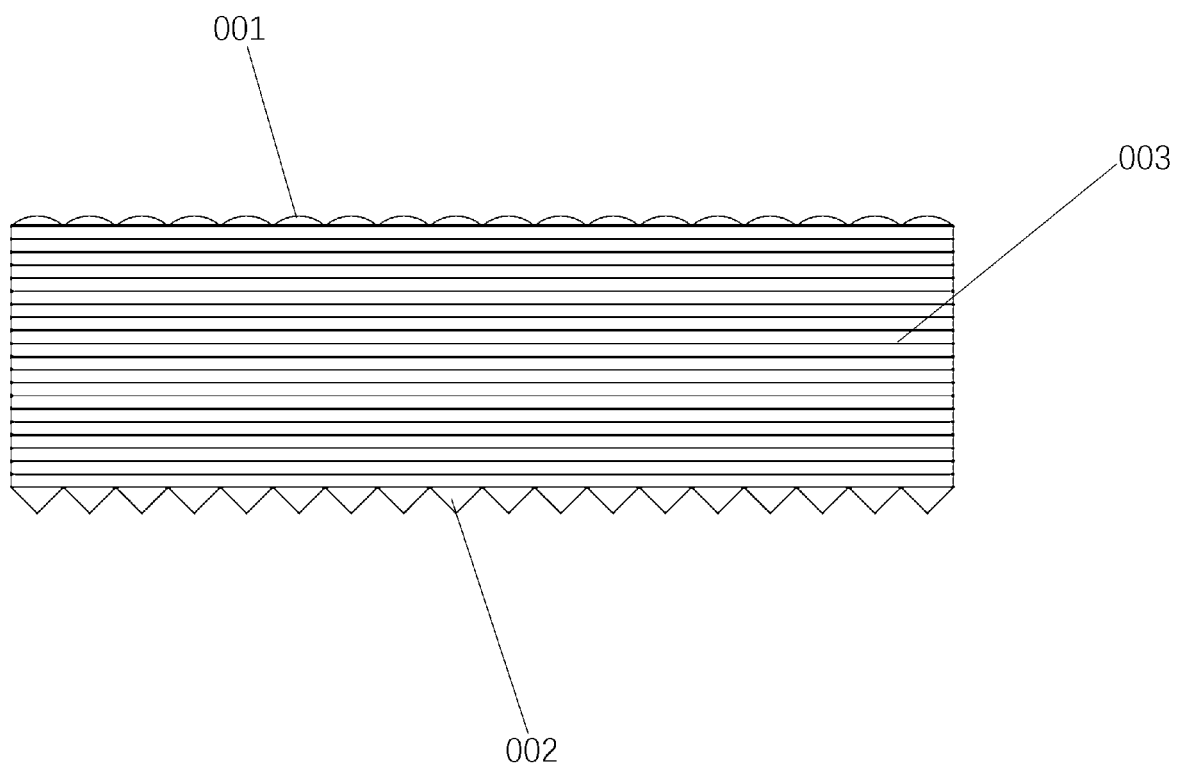
FIG. 4 is a left structural view of the wedge-shaped light guide plate according to the first embodiment of the invention.

As shown in FIG. 4 which is a schematic diagram of the wedge-shaped light guide plate 01 in this embodiment, the incident micro-prism structure is a symmetric triangular structure, the first light-emitting micro-prism structure is an arc-shaped structure, and the second light-emitting micro-prism structure is a symmetric triangular structure.

Figure 5:
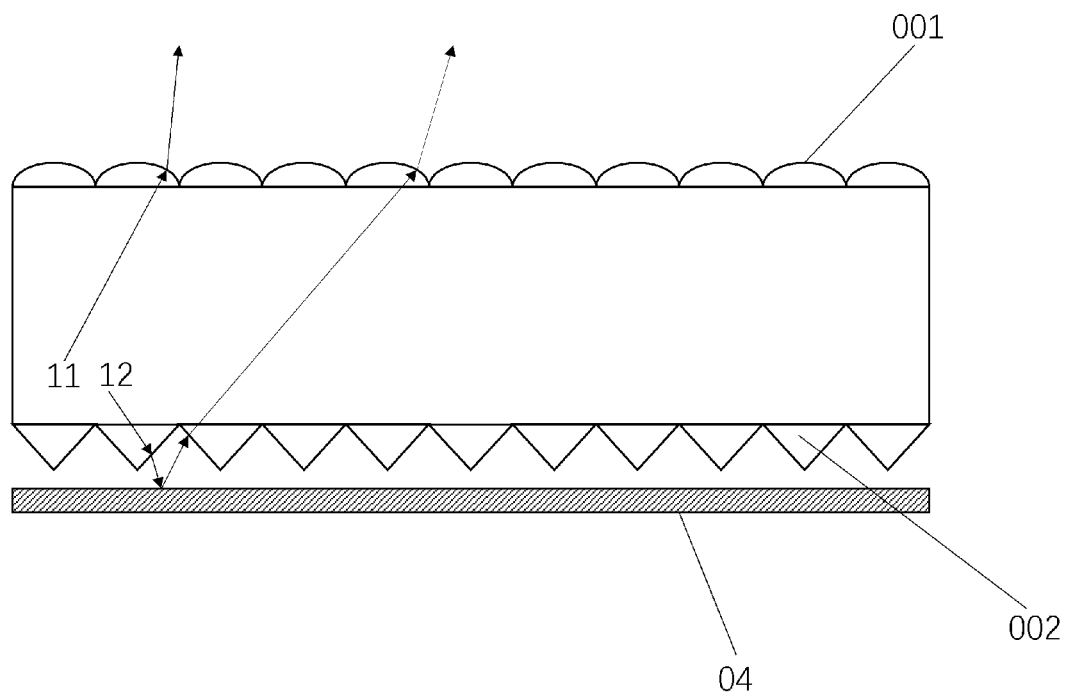
FIG. 5 is a schematic diagram of light transmission in the vertical direction of the wedge-shaped light guide plate according to the first embodiment of the invention.

FIG. 5 illustrates the transmission process of vertical lights between the first light-emitting micro-prism structure, the reflecting film 04 and the second light-emitting micro-prism structure. A light 11 in the wedge-shaped light guide plate 01 is directly emitted to the first light-emitting micro-prism structure and is then refracted by the first light-emitting micro-prism structure into the air. In this process, the first light-emitting micro-prism structure can gather to some extent the light refracted to the air. A light 12 in the wedge-shaped light guide plate 01 is emitted to the second light-emitting micro-prism structure, then transmitted onto the reflecting film 04 and reflected back by the reflecting film 04, and finally returns into the wedge-shaped light guide plate 01 through the second light-emitting micro-prism structure to enter the next cycle.

Figure 6:
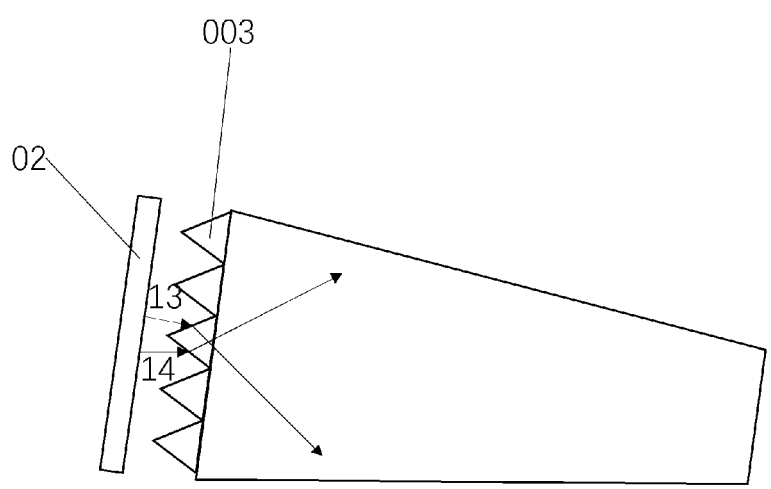
FIG. 6 is a schematic diagram of light transmission of an incident surface according to the first embodiment of the invention.

As shown in FIG. 6, a light 13 and a light 14 emitted by the strip-shaped light source 02 are refracted by the incident micro-prism structure towards the first light-emitting surface 001 and the second light-emitting surface 002. The incident micro-prism structure is mainly used for adjusting the distribution of light emitted into the wedge-shaped light guide plate 01 to change light coming out of the wedge-shaped light guide plate 01.

Figure 7:
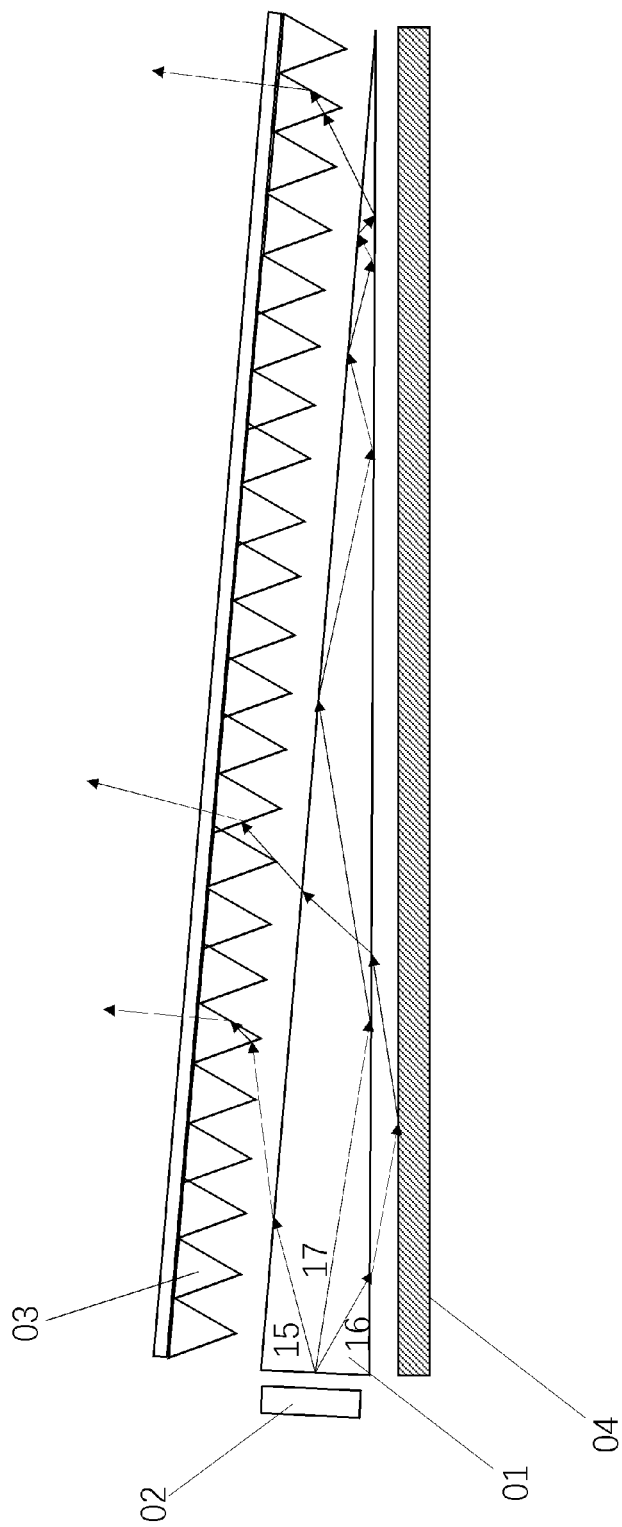
FIG. 7 is a schematic diagram of light transmission of the collimating backlight module according to the first embodiment of the invention.

FIG. 7 illustrates the transmission process in the collimating backlight module of lights 15, 16 and 17 in the wedge-shaped light guide plate 01.

The light 15 is emitted along the incident surface 003 and then propagated in the light guide plate to the first light-emitting surface 001; because the light 15 does not satisfy the total reflection condition, it is refracted by the first light-emitting surface 001 into the air, then propagated in the air to the reverse prism film 03, and refracted by the side, provided with the micro-prism structures, of the reverse prism film 03 into one micro-prism structure, the light 15 satisfies the total reflection condition when encountering the other side of the micro-structure, so it is totally reflected out in a direction approximately parallel to the normal direction of the reverse prism film.

The light 16 is emitted along the incident surface 003 and propagated to the second light-emitting surface 002, and at this moment, the light 16 does not satisfy the total reflection condition; after being refracted by the second light-emitting surface 002, the light 16 is propagated to the surface of the reflecting film 04, specularly reflected by the surface of the reflecting film 04, and then refracted into the light guide plate by the second light-emitting surface. The light 16 is linearly propagated in the light guide plate to the first light-emitting surface 001; because the light 16 does not satisfy the total reflection condition at this moment, it is refracted by the first light-emitting surface 001, propagated to one side of one micro-prism structure on the reverse prism film 03, and then refracted into the micro-prism structure; when the position of incidence of the light is close to one base angle of the micro-prism structure, the light will not encounter the other side of the micro-prism structure after being refracted, so the light 16 is linearly propagated along the angle of refraction until it is emitted out from the other side of the reverse prism film 03. In this process, the light is not totally reflected on the other side of the micro-prism structure, so the propagation direction of the light greatly deviates from the normal direction of the reverse prism film, and forms an angle with the light 15 coming out of the reverse prism film, which forms a half width of the emergent light of the collimating backlight module of the invention.

The light 17 is emitted along the incident surface 003 and propagated in the light guide plate 01 to the second light-emitting surface 002; because the light 17 does not satisfy the total reflection condition at this moment, it is totally reflected by the second light-emitting surface 002; and after the direction of the light is changed, the light continues to be propagated in the light guide plate until it does not satisfy the total reflection condition, and then the light is emitted out in the same way as the light 15 or the light 16.

Figure 8:
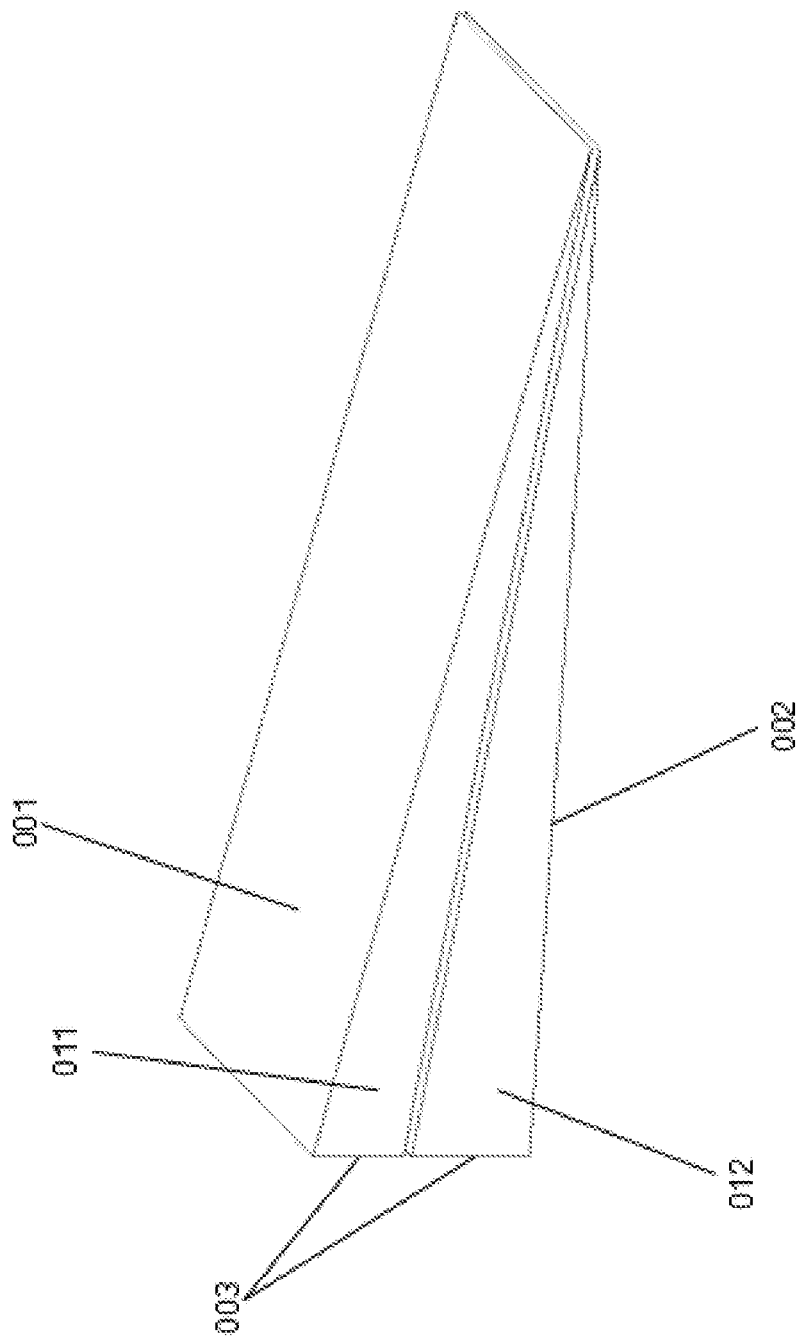
FIG. 8 is a structural diagram of two wedge-shaped light guide plates according to a second embodiment of the invention.
Figure 9:
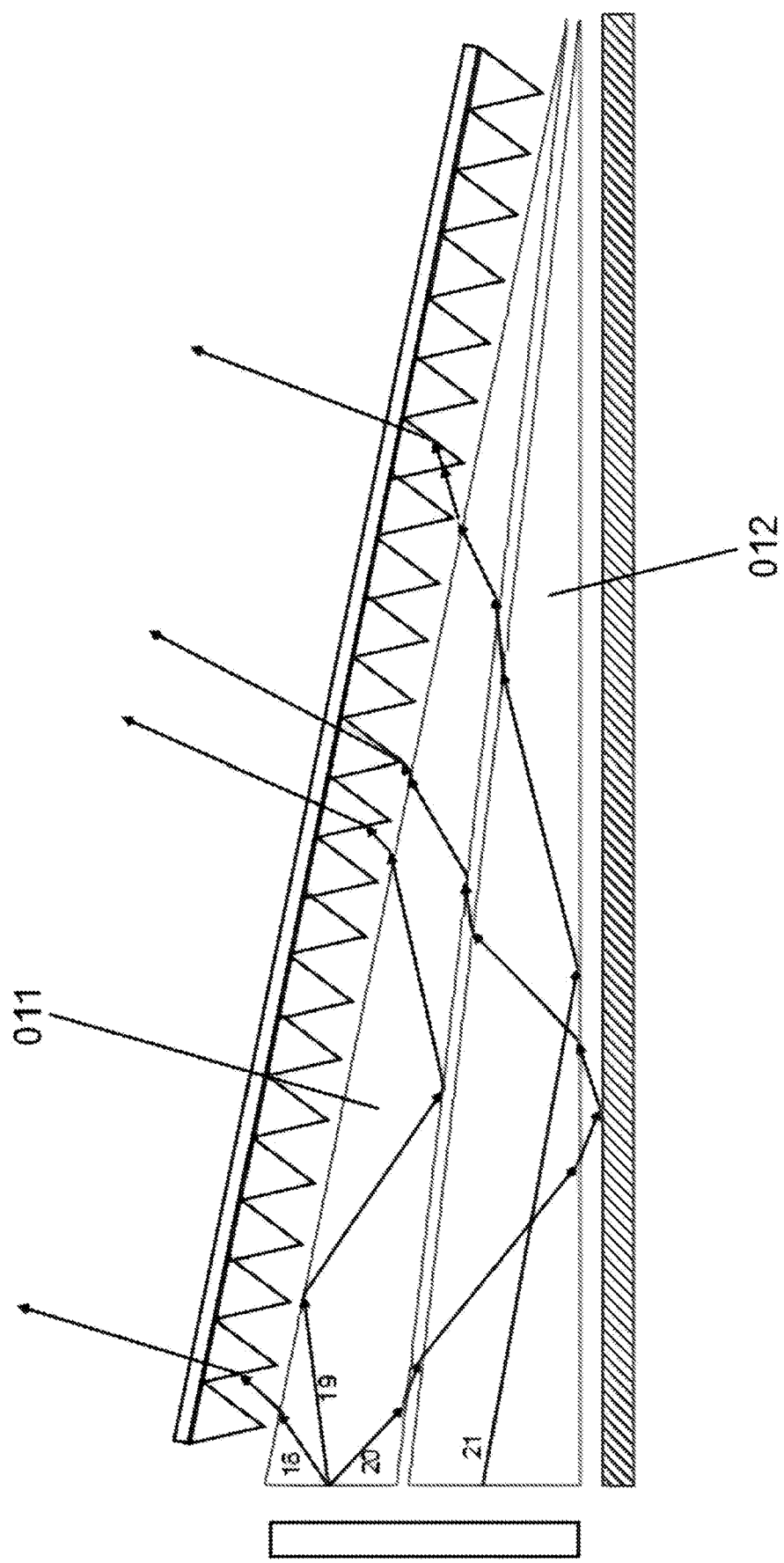
FIG. 9 is a schematic diagram of light transmission of a collimating backlight module according to the second embodiment of the invention.

Embodiment 2: As shown in FIG. 8 and FIG. 9, the collimating backlight module includes a light guide plate 011 and a light guide plate 012 which are stacked together with one above the other. The propagation process of lights in multiple light guide plates is described in this embodiment with two guide plates as an example.

As shown in FIG. 9, a light 18 is emitted along the incident surface 003 and propagated to the first light-emitting surface 001 of the wedge-shaped light guide plate 011; because the light 18 does not satisfy the total reflection condition at this moment, it is refracted into the air by the first light-emitting surface 001, propagated to one side of one micro-prism structure of the reverse prism film 03, and refracted into the micro-prism structure; at this moment, the light 18 is close to one base angle of the micro-prism structure, so it is linearly propagated to the top boundary of the reverse prism film 03, and then directly refracted out of the reverse prism film 03; due to the fact that the light 18 is not refracted by the other side of the micro-prism structure of the reverse prism film 03, there is a large angle between the light-emitting direction of the light 18 and the normal direction of the reverse prism film 03.

A light 19 is emitted along the incident surface 003, and linearly propagated in the wedge-shaped light guide plate 011 to the first light-emitting surface 001 of the wedge-shaped light guide plate 011; at this moment, the light 19 satisfies the total reflection condition and is totally reflected by the first light-emitting surface 001; after the direction of the light 19 is changed, the light 19 continues to be propagated in the wedge-shaped light guide plate 011; under the condition of satisfying the total reflection condition, every time the light is totally reflected by the first light-emitting surface 001 and the second light-emitting surface 002, the angle between the light and the normal direction of the corresponding light-emitting surface will be decreased by a wedge angle α until the light does not satisfy the total reflection condition, and then the light is emitted out. As shown in FIG. 9, if the light does not satisfy the total reflection condition when reaching the first light-emitting surface 001 of the wedge-shaped light guide plate 011 for the first time, the light 19 will be refracted into the air by the first light-emitting surface 001, then propagated to one side of one micro-prism structure of the reverse prism film 03, and then refracted into the micro-prism structure; if the light is close to the vertex angle of the micro-prism structure of the reverse prism film 03, the light 19 will be refracted, linearly propagated to the other side of the micro-prism structure, totally reflected by this side, and final refracted out by the top boundary of the reverse prism film 03, and at this moment, the angle between the light 19 and the normal direction of the reverse prism film 03 is very small, that is, the light 19 is collimated.

A light 20 is emitted along the incident surface 003 and linearly propagated in the wedge-shaped light guide plate 011 to the second light-emitting surface 002 of the wedge-shaped light guide plate 011; at this moment, the light does not satisfy the total reflection condition, so it is refracted by the second light-emitting surface 002 into an air gap between the wedge-shaped light guide plate 011 and the wedge-shaped light guide plate 012, linearly propagated to the first light-emitting surface 001 of the wedge-shaped light guide plate 012, refracted into the wedge-shaped light guide plate 012 by the first light-emitting surface 001, and linearly propagated in the wedge-shaped light guide plate 012 to the second light-emitting surface 002 of the wedge-shaped light guide plate 012; at this moment, the light still does not satisfy the total reflection condition, so it is refracted into the air by the second light-emitting surface 002 of the wedge-shaped light guide plate 012, linearly propagated to the reflecting film 04, specularly reflected by the reflecting film 04, refracted back into the wedge-shaped light guide plate 012 by the second light-emitting surface 002 of the wedge-shaped light guide plate 012, and linearly propagated to the first light-emitting surface 001 of the wedge-shaped light guide plate 012; and as can be seen from the above analysis, the light does not satisfy the total reflection condition at this moment, so the it is refracted by the first light-emitting surface 001 of the wedge-shaped light guide plate 012 back into the air gap between the wedge-shaped light guide plate 011 and the wedge-shaped light guide plate 012 again, linearly propagated to the second light-emitting surface 002 of the wedge-shaped light guide plate 011, and refracted into the wedge-shaped light guide plate 011 by the second air outlet surface 002. The light 20 is linearly propagated in the wedge-shaped light guide plate 011 to the first light-emitting surface 001 of the wedge-shaped light guide plate 011, refracted into the air by the first light-emitting surface 001, propagated to one side of one micro-prism structure of the reverse prism film 03, refracted into the reverse prism film by the micro-prism structure, then propagated in a similar way to the light 18, and finally emitted into the air.

A light 21 is emitted from the incident surface 003 and linearly propagated in the wedge-shaped light guide plate 012 to the second light-emitting surface 002 of the wedge-shaped light guide plate 012; at this moment, the light 21 satisfies the total reflection condition, so it is totally reflected and continues to be propagated in the wedge-shaped light guide plate 012 to the first light-emitting surface 001 of the wedge-shaped light guide plate 012; due to the fact that the light 21 has been totally reflected once at this moment, the angle between the light 21 and the normal direction of the first light-emitting surface 001 of the wedge-shaped light guide plate 012 is decreased by a wedge angle α, and the light 21 on the first light-emitting surface 001 no longer satisfies the total reflection condition; after being refracted by the first light-emitting surface 001, the light 21 enters the air gap between the wedge-shaped light guide plate 011 and the wedge-shaped light guide plate 012, is linearly propagated in the air gap to the second light-emitting surface 002 of the wedge-shaped light guide plate 011, then refracted into the wedge-shaped light guide plate 011, and linearly propagated to the first light-emitting surface 001 of the wedge-shaped light guide plate 011, and at this moment, the light 21 still does not satisfy the total reflection condition, so it is refracted into the air by the first light-emitting surface 001. The light 21 is linearly propagated in the air to one side of one micro-prism structure of the reverse prism film 03, refracted into the micro-prism structure, totally refracted when encountering the other side of the micro-prism structure, then propagated to the top boundary of the reverse prism film 03, and finally refracted out.

The transmission process of typical lights in the collimating backlight module including multiple light guide plates is described in detail in this embodiment, and other lights not described in this embodiment may be propagated in the module in a similar way to lights in the above embodiment and lights in this embodiment until they are refracted into the air.

In the invention, the micro-prism structures of the reverse prism film 03 may be asymmetric triangular structures.

What is claimed is:

1. A collimating backlight module comprising:
a wedge-shaped light guide plate comprising an incident surface at a thick end, a first light-emitting surface, a second light-emitting surface and two side surfaces, a wedge angle being formed between the first light-emitting surface and the second light-emitting surface, wherein an incident micro-prism structure is disposed on the incident surface, and a light-emitting micro-prism structure is disposed on at least one of the first light-emitting surface and the second light-emitting surface,
wherein the collimating backlight module is composed of at least one said wedge-shaped light guide plate, a strip-shaped light source disposed on a side of the incident surface of the wedge-shaped light guide plate, a reverse prism film disposed on a side of the first light-emitting surface, and a reflecting film disposed on a side of the second light-emitting surface, the strip-shaped light source extends from one of the side surface to the other side surface of the wedge-shaped light guide plate, and a side, provided with micro-prism structures, of the reverse prism film, faces the first light-emitting surface,
wherein the collimating backlight module comprises multiple said wedge-shaped light guide plates which are stacked together with one above the other, a first light-emitting micro-prism structure is disposed on the first light-emitting surface of the wedge-shaped light guide plate adjacent to the reverse prism film, and a second light-emitting micro-prism structure is disposed on the second light-emitting surface of the wedge-shaped light guide plate adjacent to the reflecting film.

2. The collimating backlight module according to claim 1, wherein the micro-prism structures of the reverse prism film are symmetric or asymmetric triangular structures.

* * * * *